Patented Oct. 25, 1949

2,486,304

UNITED STATES PATENT OFFICE 2,486,304

PROCESS FOR PRODUCING ORGANIC CRYSTALLIZING LIQUID STABLE PHTHALOCYANINE PIGMENTS

Serge Alexander Loukomsky, Bound Brook, N. J., assignor to American Cyanamid Company, New York, N. Y., a corporation of Maine No Drawing. Application December 27, 1946, Serial No. 718,884

12 Claims. (Cl. 260—314.5)

1

This invention relates to an improved halogen free, sulfuric acid stable metal tetrazaporphine pigments.

A number of pigments of the tetrazaporphine group have been prepared. Of these pigments only the phthalocyanines (tetrazabenzo tetrazaporphine) have achieved commercial success by reason of the exceptional fastness to the light and weather of a number of these phthalocyanines such as for example, the copper, zinc, iron, cobalt and nickel phthalocyanines. Because of the practical importance of the phthalocyanines it has been customary in the art to refer to all the metal and metal free tetrazaporphine pigments as pigments of the phthalocyanine type. Typical tetrazaporphines other than phthalocyanine itself are tetranaphtha tetrazaporphines, alkyl and aryl derivatives of phthalocyanine, halogenated phthalocyanines, tetrazaporphines with fused heterocyclic rings, and the like. Even the phthalocyanine pigments are subject to a series of drawbacks, namely that when exposed to most organic liquids such as those encountered in coating compositions, for example, aromatic hydrocarbons, esters and the like, they tend to increase in particle size forming larger crystals averaging much larger than 2 microns and as a result covering power and tinctorial value drop very severely. In addition pronounced shade changes occur, frequently rendering the colored composition eventually useless. The difficulties involved are particularly encountered with the finely divided pigments prepared by various precipitation methods such as for example, acid pasting in sulfuric acid. With such methods of preparation finely divided pigments are obtained but as soon as they are brought into contact with the ordinary organic vehicles for paints, lacquers and plastics, crystals begin to grow and the tinctorial value drops very sharply.

Another disadvantage of the crystal growth lies in the fact that the larger crystals tend to thicken paints or other coating compositions, frequently to a viscosity too high for satisfactory use.

The disadvantages discussed above have very seriously interfered with the commercial exploitation of the pigments of the phthalocyanine type because these pigments are normally used to a large extent in coating compositions such as inks, paints, lacquers, plastics and the like, which contain in the vehicles organic liquids inducing crystal growth hereafter referred to as crystallizing liquids. In spite of the extraordinarily valuable properties of great light fastness and in many cases pronounced chemical stability, pigments of the phthalocyanine type have been seriously restricted in their fields of usefulness.

2

A number of phthalocyanine pigments, such as for example, copper phthalocyanine have been halogenated and where halogen has been introduced in some cases, the difficulties encountered with crystallizing liquids have not arisen. However, these halogenated pigments are of different shades from the unhalogenated pigments and in most cases cannot be used in their place.

In the copending application of Richard H. Wiswall, Serial No. 524,923, filed March 3, 1944, there is described a process of producing halogen free phthalocyanine pigments with a particle size not over 2 microns on the average, which are stable against crystal growth in contact with the ordinary crystallizing organic liquids. The process involves three steps. The phthalocyanine pigment is first transformed into a coarse crystal form with large particle size, for example, by inducing crystal growth in a crystallizing liquid. These coarse crystals are then ground with a dry grinding aid, which may be of the removable type, such as sodium chloride, which can be leached with water, or calcium carbonate, which can be leached with acid, or materials which can remain with the ground pigment to act as extenders, such as diatomaceous earth, blanc fixe, powdered silica, or the like. The finely ground material, which has a particle size well under two microns on the average, and usually under one micron, is then stabilized by subjecting it to the action of an organic liquid which exerts crystallizing action. A very slight growth in crystal size results, the average particle size remaining under two microns, and after this slight growth the material is then stable against further crystallizing growth in crystallizing liquids and can be incorporated in coating such as inks, paints, lacquers and the like and stored for a long period of time without any change in crystal size of the pigment.

The Wiswall process produces pigments, the physical characteristics of which leave nothing to be desired. However, the process requires three separate steps and this results in a fairly long time cycle which, together with the added labor required for the multiple steps, increases the production cost. The product shows so great an advantage in its physical properties that the expensive multi step process is warranted, even though it materially increases the cost of the resulting pigment.

The present invention relates to an improved method of producing finely divided, solvent stable tinctorially strong, halogen free, sulfuric acid, stable, metal phthalocyanine pigments in a single operation with resulting savings in equipment and labor and increase in output in a given time.

Essentially the process of the present invention comprises a single treatment in an intensive mixing or grinding device such as a dough mixer, chaser mill or a ball mill with very large balls, of these finely divided phthalocyanine pigments in the presence of a solid grinding aid and a small amount of a crystallizing liquid, followed by mixing the ground pigment with larger amounts of solvent in the same apparatus and without interrupting the process. The product obtained, after removing the grinding aid, if this is necessary, is solvent stable, as is the product of the Wiswall process. The same valuable physical properties are thus obtained in a single operation instead of in three steps and materially lowered costs result without any sacrifice in quality of the product.

It is not definitely known just what takes place in the process any more than it is known just what takes in place in the Wiswall process. Therefore, it is not desired to limit the present invention to any particular theory of action.

The reason why it is possible to obtain in one step the same effect as Wiswall obtains in three steps is not completely understood. The result is contrary to that which would normally be expected because it was found by Wiswall that grinding of finely divided acid pasted phthalocyanine pigments, no matter how long continued, did not produce solvent stable pigments. Yet when the grinding is effected in the presence of a small amount of crystallizing liquid, followed after complete grinding by mixing with a larger amount of liquid, the transformation to finely divided solvent stable crystals is effected. In the Wiswall process this was only possible when the pigment had been first transformed into large crystals by growth in the crystallizing liquid, followed by dry grinding with a grinding aid, and reexposure to the liquid. Apparently in the present process transformation of crystal form and fine division occur simultaneously. The mechanism of operation, while radically different from that used in the Wiswall process, appears to produce the same finely divided solvent stable pigment. The grinding with a grinding aid of the present invention is not of the type requiring machines usually used for the fine grinding of hard materials such as ball mills, rod mills and the like. Such machines, however, can be used if properly adjusted or redesigned. The preferred equipment is that which exerts shearing in a coarse paste, such as a dough mixer or other apparatus capable of operating with a comparatively stiff pasty material. While such equipment might not be considered as a grinder in the narrow sense, it is capable of effecting or maintaining the fine division of the pigment particles in the present invention.

The crystallizing organic liquid used in the present invention may be any of the common well known types, such as those described in the Wiswall application. Most of these liquids are aromatic or aliphatic hydrocarbons, although esters, ethers, or chlorinated hydrocarbons exert a similar action if the time of contact is extended. Typical examples are xylene, toluene and amylacetate. The crystallizing liquids appear to be more or less interchangeable, although slight differences will be noted between different solvents. The low prices of the xylenes make these a very satisfactory type of crystallizing liquid to be used both in the first part of the grinding step, where a small amount of solvent is present, and in the latter part of the step where additional solvent is added after.

A further important advantage of the present invention is that the solvent stable pigments produced also do not cause thickening of paint or other coating compositions.

In the present invention phthalocyanine pigments which have poor resistance to crystallization in solvents such as those prepared by acid pasting and drowning in water can be easily transformed to the stable form. With certain phthalocyanine pigments which are somewhat more resistant but not completely resistant to crystallization the transformation may need to be accelerated; otherwise excessively long periods of intensive mixing or grinding may be necessary. In such cases the transformation can be accelerated by using (1) a higher solvency solvent such as a chlorinated hydrocarbon, (2) a higher temperature and or (3) surface active agents such as xylene, benzene or naphthalene sulfonates.

The invention will be described in greater detail in conjunction with the following example:

*Example 1*

Into a Werner-Pfleiderer mixer of 50 gallons capacity provided with a cover are loaded:

| | Pounds |
|---|---|
| Dry salt, micromilled through a 0.020" screen | 800 |
| Dry acid pasted unchlorinated copper phthalocyanine, prepared under solvent naphtha by process of U. S. P. 2,318,787 | 100 |
| Xylene added in a period of one hour, under $CO_2$ atmosphere | 150 |

The mixer is continued for 4 hours in a semi-dry state, the temperature rising to approximately 50° C. After 4 hours of mixing, 50 lbs. of xylene are added, completely wetting out the mix, and the mixing is continued for 2 hours. The mix is then stripped, filtered and washed free of salt. The time cycle for the process depends on the mixer used, and can be shortened with a fast mixer.

*Example 2*

Into a dough mixer provided with sigma blades are loaded:

| | Parts |
|---|---|
| Dry acid pasted unchlorinated copper phthalocyanine prepared under methylcyclohexane by process of U. S. P. 2,318,787 | 60 |
| Dry salt micromilled through a 0.020" screen | 500 |
| Decalin | 150 |

The pigment and salt are placed in the mixer and then the decalin is added in 25 part quantities as the mixing progresses as needed to maintain a cohesive mass. Mixing was continued for 8 hours. The decalin was stripped from the mixture and then the pigment was washed free of salt and then filtered. It was then air dried at 63° C. for 20 hours.

*Example 3*

Into a dough mixer provided with sigma blades are loaded:

| | Parts |
|---|---|
| Dry acid pasted unchlorinated copper phthalocyanine | 25 |
| Dry salt micromilled through a 0.020" screen | 225 |
| Xylene | 60 |

The pigment and salt are placed in the mixer and then the xylene is added in 25 part quantities as the mixing progresses as needed to maintain a cohesive mass. Mixing was continued for 8 hours. The xylene was stripped from the mixture and then the pigment was washed free of salt and then filtered. It was then air dried at 63° C. for 20 hours.

*Example 4*

Into a Banbury mixer of 50 gallons capacity provided with a cover are loaded:

| | Pounds |
|---|---|
| $CaCO_3$, micromilled through a 0.020" screen | 800 |
| Dry acid pasted unchlorinated copper phathalocyanine, prepared under solvent naptha by process of U. S. P. 2,318,787 | 100 |
| Xylene added in a period of one hour, under $CO_2$ atmosphere | 150 |

The mixer is continued for 4 hours in a semi-dry state, the temperature rising to approximately 50° C. After 4 hours of mixing, 50 lbs. of xylene are added, completely wetting out the mix, and the mixing is continued for 2 hours. The mix is then stripped, filtered and the $CaCO_3$ removed by hydrochloric acid and washing. The time cycle for the process depends on the mixer used, and can be shortened with a fast mixer.

*Example 5*

Into a Werner-Pfleiderer mixer of 50 gallons capacity provided with a cover are loaded:

| | Pounds |
|---|---|
| Dry salt, micromilled through a 0.020" screen | 800 |
| Dry acid pasted unchlorinated zinc phthalocyanine, prepared under solvent naphtha by process of U. S. P. 2,318,787 | 100 |
| Xylene added in a period of one hour, under $CO_2$ atmosphere | 150 |

The mixer is continued for 4 hours in a semi-dry state, the temperature rising to approximately 50° C. After 4 hours of mixing, 50 lbs. of xylene are added, completely wetting out the mix, and the mixing is continued for 2 hours. The mix is then stripped, filtered and washed free of salt. The time cycle for the process depends on the mixer used, and can be shortened with a fast mixer.

I claim:

1. A method of producing a finely divided, crystallizing organic liquid stable, tinctorially strong, sulfuric acid stable, metal phthalocyanine pigment the particles whereof have an average size of less than two microns and do not increase in size beyond an average size of less than two microns on prolonged contact with crystallizing organic liquids, which comprises subjecting a mixture of a finely divided, halogen-free, sulfuric acid stable, metal phthalocyanine, a solid grinding aid, and sufficient crystallizing organic liquid to form a shearable magma to intensive mixing and shearing attrition, until said phthalocyanine is transformed into finely divided, crystallizing organic liquid stable form, having an average particle size below two microns and mostly below one micron.

2. A method of producing a finely divided, crystallizing organic liquid stable, tinctorially strong, sulfuric acid stable, metal phthalocyanine pigment the particles whereof have an average size of less than two microns and do not increase in size beyond an average size of less than two microns on prolonged contact with crystallizing organic liquids, which comprises subjecting a mixture of a finely divided, halogen-free, sulfuric acid stable, metal phthalocyanine, a solid grinding aid, and sufficient crystallizing organic liquid to form a shearable magma to intensive mixing and shearing attrition, until said phthalocyanine is transformed into finely divided, crystallizing organic liquid stable form, having an average particle size below two microns and mostly below one micron, and adding additional organic crystallizing liquid and continuing the attrition until a uniform paste is produced.

3. A method of producing a finely divided, crystallizing organic liquid stable, tinctorially strong, sulfuric acid stable, copper phthalocyanine pigment the particles whereof have an average size of less than two microns and do not increase in size beyond an average size of less than two microns on prolonged contact with crystallizing organic liquids, which comprises subjecting a mixture of a finely divided, halogen-free, sulfuric acid stable, copper phthalocyanine, a solid grinding aid, and sufficient crystallizing organic liquid to form a shearable magma to intensive mixing and shearing attrition, until said phthalocyanine is transformed into finely divided, crystallizing organic liquid stable form, having an average particle size below two microns and mostly below one micron.

4. A method of producing a finely divided, crystallizing organic liquid stable, tinctorially strong, sulfuric acid stable, copper phthalocyanine pigment the particles whereof have an average size of less than two microns and do not increase in size beyond an average size of less than two microns on prolonged contact with crystallizing organic liquids, which comprises subjecting a mixture of a finely divided, halogen-free, sulfuric acid stable, copper phthalocyanine, a solid grinding aid, and sufficient crystallizing organic liquid to form a shearable magma to intensive mixing and shearing attrition, until said phthalocyanine is transformed into finely divided, crystallizing organic liquid stable form, having an average particle size below two microns and mostly below one micron, and adding additional organic crystallizing liquid and continuing the attrition until a uniform paste is produced.

5. A method of producing a finely divided, crystallizing organic liquid stable, tinctorially strong, sulfuric acid stable, zinc phthalocyanine pigment the particles whereof have an average size of less than two microns and do not increase in size beyond size of less than two microns on prolonged contact with crystallizing organic liquids, which comprises subjecting a mixture of a finely divided, halogen-free, sulfuric acid stable, zinc phthalocyanine, a solid grinding aid, and sufficient crystallizing organic liquid to form a shearable magma to intensive mixing and shearing attrition, until said phthalocyanine is transformed into finely divided, crystallizing organic liquid stable form, having an average particle size below two microns and mostly below one micron.

6. A method of producing a finely divided, crystallizing organic liquid stable, tinctorially strong, sulfuric acid stable, zinc phthalocyanine pigment the particles whereof have an average size of less than two microns and do not increase in size beyond an average size of less than two microns on prolonged contact with crystallizing organic liquids, which comprises subjecting a mixture of a finely divided, halogen-free, sulfuric acid stable, zinc phthalocyanine, a solid grinding aid, and sufficient crystallizing organic liquid to form a shearable magma to intensive mixing and shearing attrition, until said phthalocyanine is transformed into finely divided, crystallizing organic liquid stable form, having an average particle size below two microns and mostly below one micron, and adding additional organic crystallizing liquid and continuing the attrition until a uniform paste is produced.

7. A method according to claim 1 in which the grinding aid is a water soluble solid and is leached out after the attrition is complete.

8. A method according to claim 2 in which the grinding aid is a water soluble solid and is leached out after the attrition is complete.

9. A method according to claim 3 in which the grinding aid is a water soluble solid and is leached out after the attrition is complete.

10. A method according to claim 4 in which the grinding aid is a water soluble solid and is leached out after the attrition is complete.

11. A method according to claim 5 in which the grinding aid is a water soluble solid and is leached out after the attrition is complete.

12. A method according to claim 6 in which the grinding aid is a water soluble solid and is leached out after the attrition is complete.

SERGE ALEXANDER LOUKOMSKY.

REFERENCES CITED

The following references are of record in the file of this patent:

UNITED STATES PATENTS

| Number | Name | Date |
|---|---|---|
| 1,837,772 | Hailwood et al. | Dec. 22, 1931 |
| 2,065,762 | Stanley | Dec. 29, 1936 |
| 2,282,303 | Morrison | May 12, 1942 |
| 2,402,167 | Lang et al. | June 18, 1946 |